US012026795B2

(12) United States Patent
Lynch et al.

(10) Patent No.: US 12,026,795 B2
(45) Date of Patent: Jul. 2, 2024

(54) HAILING, PICKUP, AND RENDEZVOUS IN A MOBILE ECOSYSTEM

(71) Applicant: Apple Inc., Cupertino, CA (US)

(72) Inventors: Stephen B. Lynch, Portola Valley, CA (US); Matthew J. Allen, Palo Alto, CA (US); Kurt L. Adelberger, Seattle, WA (US); Evan Burton, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 185 days.

(21) Appl. No.: 17/401,673

(22) Filed: Aug. 13, 2021

(65) Prior Publication Data

US 2022/0092718 A1 Mar. 24, 2022

Related U.S. Application Data

(60) Provisional application No. 63/082,114, filed on Sep. 23, 2020.

(51) Int. Cl.
| | |
|---|---|
| *G06Q 50/47* | (2024.01) |
| *B60W 60/00* | (2020.01) |
| *G01C 21/34* | (2006.01) |
| *G06Q 10/02* | (2012.01) |
| *G06Q 50/40* | (2024.01) |

(52) U.S. Cl.
CPC ........ *G06Q 50/40* (2024.01); *B60W 60/00253* (2020.02); *G01C 21/3438* (2013.01); *G06Q 10/02* (2013.01); *G06Q 50/47* (2024.01)

(58) Field of Classification Search
CPC ........ G06Q 50/30; G06Q 10/02; G06Q 50/40; G06Q 50/43; G06Q 50/47; B60W 60/00253; G01C 21/3438
See application file for complete search history.

(56) References Cited

U.S. PATENT DOCUMENTS

| | | | |
|---|---|---|---|
| 8,442,758 | B1 | 5/2013 | Rovik et al. |
| 10,290,074 | B2 | 5/2019 | Sweeney et al. |
| 10,303,181 | B1 | 5/2019 | Wengreen et al. |
| 10,466,057 | B1 | 11/2019 | Schwie et al. |
| 2017/0277191 | A1 | 9/2017 | Fairfield et al. |
| 2018/0267536 | A1* | 9/2018 | Goldberg ............. G05D 1/0212 |

(Continued)

FOREIGN PATENT DOCUMENTS

| | | |
|---|---|---|
| JP | 2019185144 A | 10/2019 |
| JP | 202097403 A | 6/2020 |

OTHER PUBLICATIONS

Millard-Ball, A. (2017). Pedestrians, Autonomous Vehicles, and Cities. Journal of Planning Education and Research, vol. 38, Issue 1 (Year: 2017).*

*Primary Examiner* — Jeff Zimmerman
*Assistant Examiner* — Wayne S. Murray
(74) *Attorney, Agent, or Firm* — Young Basile Hanlon & MacFarlane, P.C.

(57) ABSTRACT

Based on a cost function that estimates a value of a confidence level above a confidence threshold using user information, an autonomous control system can determine that a user of a user device is ready for a pickup, identify a pickup location based on the user information, and determine a trajectory from a current location to the pickup location. A propulsion system is configured to cause motion current location toward the pickup location according to the trajectory.

20 Claims, 5 Drawing Sheets

(56) References Cited

U.S. PATENT DOCUMENTS

| | | | | |
|---|---|---|---|---|
| 2018/0342157 A1* | 11/2018 | Donnelly | ............... | G08G 1/205 |
| 2019/0137290 A1* | 5/2019 | Levy | .................... | B60Q 1/5035 |
| 2019/0297450 A1* | 9/2019 | Hwang | .................. | H04W 4/02 |
| 2020/0033882 A1* | 1/2020 | Zysk, Jr. | ................ | H04W 4/024 |
| 2020/0149909 A1 | 5/2020 | Beaurepaire et al. | | |
| 2021/0018916 A1* | 1/2021 | Thakur | ................ | G05D 1/0276 |

\* cited by examiner

HAILING, PICKUP, AND RENDEZVOUS IN A MOBILE ECOSYSTEM

CROSS-REFERENCE TO RELATED APPLICATION(S)

This application claims priority to U.S. Provisional Application Ser. No. 63/082,114, filed Sep. 23, 2020, the contents of which are incorporated herein by reference.

FIELD

The present disclosure relates generally to hailing and pickup and specifically to use of a mobile ecosystem to support hailing, pickup, and rendezvous decisions in the mobile ecosystem.

BACKGROUND

Hailing a ride-share for hire with existing application technology can be an overly complicated process. Details that require user input into a ride-share algorithm include current location of the user, desired location for pickup, desired time for pickup, user preferences for type, etc. In addition, the hailing process often requires additional interaction between the user and the operator, through texts or calls, as one party may not be able to easily locate the other party for the requested pickup despite a list of parameters input by both parties. Further, the user of a ride-share needs to consider various factors such as when to hail the ride-share to avoid a lengthy wait at the pickup location, where to tell the operator of the ride-share to make the pickup, and how long it will take both the user and the ride-share to travel to the pickup location based, for example, on traffic conditions or other navigational roadblocks.

SUMMARY

One aspect of the disclosed embodiments is a mobile ecosystem. The mobile ecosystem includes a user device in communication with a network and a vehicle having an autonomous control system in communication with the network. At least one of the user device, the vehicle, or the network is operable to receive user information from the user device, receive vehicle information from the vehicle, determine a user is ready for a pickup based on the user information, and identify a rendezvous based on the user information and the vehicle information. The autonomous control system of the vehicle is operable to cause the vehicle to travel to the rendezvous in response to determining that the user is ready for the pickup.

Another aspect of the disclosed embodiments is a vehicle including an autonomous control system configured to obtain vehicle information including a vehicle location of the vehicle and obtain user information including a user location of a user device. Based on a cost function that estimates a value of a confidence level above a confidence threshold using the user information, the autonomous control system is configured to determine that a user of the user device is ready for a pickup by the vehicle, identify a pickup location for the vehicle based on the user information and the vehicle information, and determine a trajectory from the vehicle location to the pickup location. The vehicle includes a propulsion system configured to cause motion of the vehicle from the vehicle location toward the pickup location according to the trajectory.

Another aspect of the disclosed embodiments is a method of hailing a vehicle. The method includes obtaining user information including a user location from a user device and obtaining vehicle information including a vehicle location from the vehicle. In response to determining that a user is ready for a pickup by the vehicle based on the user information, the method includes identifying a rendezvous based on the user information and the vehicle information and sending a command to an autonomous control system of the vehicle to cause the vehicle to travel to from the vehicle location to the rendezvous. In response to determining that a user is ready for the vehicle to shadow the user based on the user information, the method includes identifying a shadow route for the vehicle or a staging location for the vehicle based on the user information and the vehicle information and sending a command to the autonomous control system of the vehicle to cause the vehicle to follow the shadow route or travel to the staging location.

DETAILED DESCRIPTION

Ride hailing methods and systems using a mobile ecosystem are disclosed. The mobile ecosystem includes a vehicle with an autonomous control system configured to operate the vehicle in a driverless manner and a user device in communication with the vehicle (e.g., though a network). Based on user information accessible to the user device, such as calendar information, biometric information, user location information, location history information, etc., ride hailing can be streamlined by having the mobile ecosystem automatically determine when a user of the user device is ready for a pickup or rendezvous based on contextual clues from the user information such as upcoming appointments, changes in a location of the user device, or changes in an environment surrounding the user device. In some examples, no inputs from the user are required, and a readiness determination can be made through use of a cost function when a value of a confidence level of an imminent pickup or rendezvous is high enough to justify or overcome any costs associated with readying the vehicle to make the pickup or rendezvous.

Figure 1:
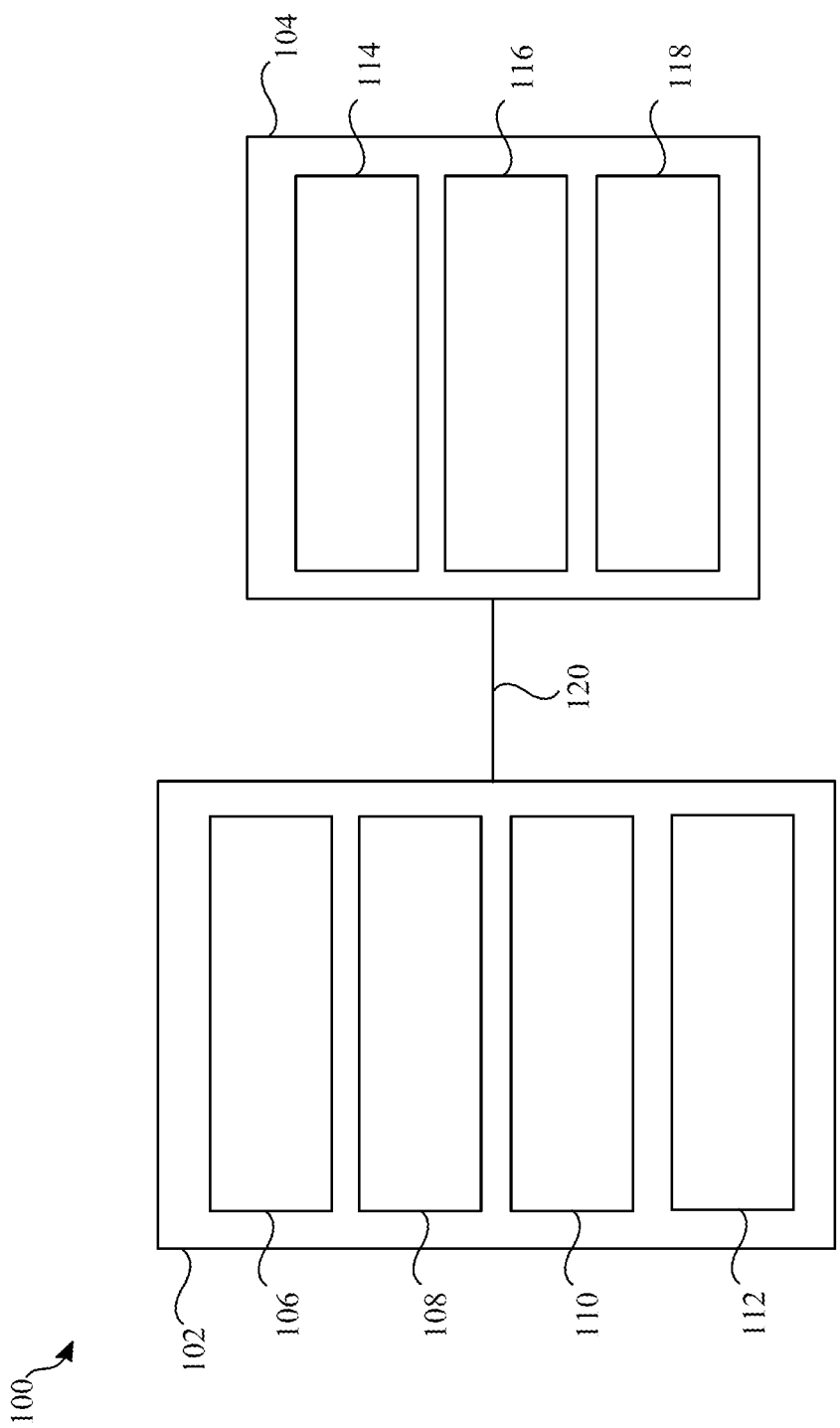
FIG. 1 is a block diagram of a mobile ecosystem.

FIG. 1 is a block diagram of a mobile ecosystem 100 suitable to implement the ride hailing methods described herein. The mobile ecosystem may include a vehicle 102 and a user device 104. Though a single vehicle 102 and a single user device 104 are shown, multiple vehicles or multiple user devices may be part of the mobile ecosystem 100.

The vehicle 102 may include a sensor system 106, an autonomous control system 108, a propulsion system 110, and a seating system 112. These components are attached and/or form parts of a physical structure of the vehicle 102, such as part of a body, interior, suspension, or frame (not shown), and are electrically interconnected to allow transmission of signals, data, commands, etc., between them, either over wired connections, (e.g., using a wired communications bus) or over wireless data communications channels. Conventional components of other types may be included in the vehicle 102, such as a charging system, a ventilation system, or an infotainment system (not shown).

The sensor system 106 of the vehicle 102 may capture or receive information about the vehicle 102 which is referred to as vehicle information. Vehicle information can be received from components of the vehicle 102 or from an external environment where the vehicle 102 is located. The external environment can be an exterior of the vehicle 102, an interior of the vehicle 102, or an environment surrounding the vehicle 102. Vehicle information captured or received by the sensor system 106 can relate to occupants within the vehicle 102, other vehicles, pedestrians and/or objects in the external environment, operating conditions of the vehicle 102, operating conditions or trajectories of other vehicles, and other conditions within the vehicle 102 or exterior to the vehicle 102. For example, vehicle information may include a vehicle location of the vehicle 102, traffic information for vehicular or pedestrian traffic around the vehicle 102, a current vehicle configuration that identifies positions of seats in the seating system 112 or other interior features of the vehicle 102, or information that identifies staging locations for the vehicle 102, that is, areas where the vehicle 102 may safely wait, park, or circle within the external environment. Staging locations can be continuously updated based on previous operation of the vehicle 102 or routes traversed by the vehicle 102.

The autonomous control system 108 uses vehicle information and sensor outputs from the sensor system 106 to understand the environment around the vehicle 102 and to plan trajectories for the vehicle 102. A trajectory can be based on a current vehicle location and a pickup location for the vehicle 102. The autonomous control system 108 is configured to determine one or more trajectories for the vehicle 102, including paths or routes to be traveled and speed or velocity profiles along the paths or routes, consistent with the vehicle 102 achieving a rendezvous with a user of the user device 104 according to user information from the user device 104. The term "rendezvous" can indicate a pickup location, a pickup or arrival time, a pickup vehicle configuration, or other information consistent with a meet-up between the vehicle 102 and the user of the user device 104. In some examples, the user may stow cargo in the vehicle 102 instead of entering the vehicle 102 for a ride; this is consistent with the term "rendezvous." The autonomous control system 108 can be implemented to move the vehicle automatically (e.g., without a driver) using multiple components including hardware components and/or software components. As an example, the autonomous control system 108 can be implemented in the form of one or more computing devices that are provided with control software. The control software includes computer program instructions that allow the autonomous control system 108 to perform the functions that are described herein.

The propulsion system 110 includes components (e.g., actuators, motors, batteries, axles, wheels, etc.) that cause the vehicle 102 to move. As an example, the propulsion system 110 may include a combustion engine that is configured to and propel the vehicle 102, such as by providing drive torque to one or more wheels. The propulsion system 110 can be controlled by commands received from the autonomous control system 108. As an example, the autonomous control system 108 can output commands to the propulsion system 110 that cause the propulsion system 110 to move the vehicle 102 in accordance with a trajectory, such as causing the vehicle 102 to travel to a rendezvous in response to determining that a user of the user device 104 is ready for a pickup.

The seating system 112 can include seats having seat backs rotatable in respect to seat pans, seats rotatable or translatable in respect to other seats, table systems or other surfaces configurable to provide occupants of the vehicle with entertainment or working surfaces, or other components that can be moved, positioned, or otherwise configured to meet user-specific preferences for setup of the vehicle 102 in the form of a vehicle configuration. One example of a vehicle configuration is a mobile office configuration with seats in the seating system 112 rotated to face each other and to face a table system, for example, having a work surface in a central position within an interior of the vehicle 102. Another example of a vehicle configuration is a sleeping configuration with seats in the seating system 112 having seat backs positioned in deep recline or generally parallel to seat pans to allow an occupant to lie flat within the vehicle 102 to sleep or nap. Another example of a vehicle configuration is a cargo configuration with some or all seats in the seating system 112 collapsed or positioned to allow the vehicle 102 to carry voluminous cargo or larger-sized cargo.

The user device 104 may include a sensor system 114, a user interface 116, and a user profile 118. These components are electrically interconnected within the user device 104 to allow transmission of signals, data, commands, etc., between them, either over wired connections, (e.g., using a wired communications bus) or over wireless data communications channels. Conventional components of other types may be included in the user device 104. For example, the user device 104 can communicate with the vehicle 102 via a network 120 that can include any manner of wired or wireless interface that allows the user device 104 to communicate with other components or systems, such as by sending data transmission and receiving data transmissions.

The sensor system 114 of the user device 104 may help capture or receive information about the user of the user device 104, one form of user information. The user information supplied from the sensor system 114 can include biometric information, user location, location history information, and user environment information. Biometric information can refer to a physiological status of the user, such as heart rate, walking speed, drowsiness level, or other physical or emotional features of the user. User environment information can be captured by the sensor system 114 from a physical location adjacent to the user device 104. For example, user information may include a user location of the user device 104 (as held or nearby the user), user environment information such as whether the user device 104 is physically located outdoors, indoors, in a highly populated area, in an isolated area, in a user's hand, or not currently visible to the user.

The user interface 116 can include any type of human-machine interface such as buttons, switches, touch-sensitive input devices, audio devices, display screens, or gestural devices suitable to receive input from a user of the user device 104 and provide indications to users regarding operations of the user device 104. A user can interact with the user interface 116, for example, to provide authorization information that indicates that the user (or another user) is authorized, allowed, or otherwise ready for pickup by the vehicle 102, for example, at a suggested rendezvous or pickup location. The authorization information can include an indication of user readiness, a confirmation of the pickup location, a confirmation of user preferences such as a user vehicle configuration, etc.

The user profile 118 can store user information related to user preferences or activity, both current and historical. The user information that forms the user profile 118 can include calendar information, biometric information, purchase history information, user environment information, location history information, and user preference information. Calendar information can include a scheduled meetings or events for a user as well as locations and times for the meetings or events. Purchase history information can include transactions completed using the user device 104, such as meal purchases, purchase of goods or services, etc. Location history information can include map information representative of places where the user has traveled and time information representative of timing and patterns of user travel to such places (e.g., the user visits a specific gym on Tuesday and Thursday mornings or the user picks up children from school each weekday afternoon around 4:30 PM). User preference information can include a user vehicle configuration that describes preferred seat settings or other vehicle settings such as climate control temperatures, mirror positions, preferred radio stations, etc.

The vehicle 102 and the user device 104 communicate via the network 120 to form the mobile ecosystem 100. The network 120 (such as including a cloud computing device) or the vehicle 102 is able to automatically detect transportation needs of the user based on user information provided by the user device 104 in order to streamline the hailing process (e.g., to automate a rendezvous or a pickup) without the need for the user to provide multiple inputs to the user device 104, or in some cases, without the need for the user to provide any inputs to the user device 104. Various examples of vehicle hailing executed using the mobile ecosystem 100 are described herein.

Figure 2:
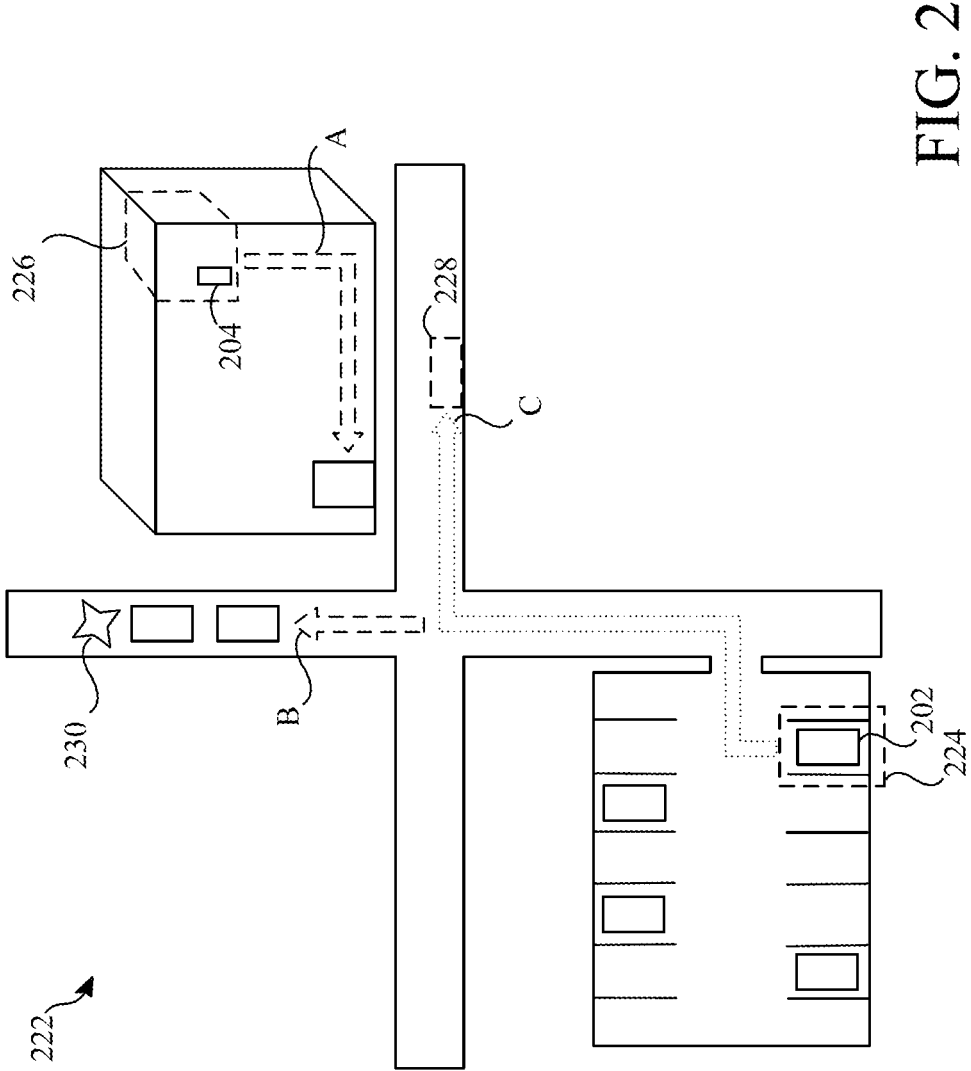
FIG. 2 is an illustration showing a vehicle and user device in an environment.

FIG. 2 is an illustration showing a vehicle 202 and a user device 204 in an environment 222. The vehicle 202 and the user device 204 are part of a mobile ecosystem and in communication with each other through a network (e.g., that includes a remote or cloud computing system, not shown). The vehicle 202 and the user device 204 can have similar features to the vehicle 102 and the user device 104 described in respect to FIG. 1.

The vehicle 202 can be physically situated in a detectable or identifiable vehicle location 224 within the environment 222. In this example, the vehicle location 224 is a parking spot in an outdoor parking lot shown in dashed line. The vehicle location 224 can serve as a staging location, that is, a location where the vehicle 202 can wait until a rendezvous or user pickup associated with the user device 204 is indicated. Though shown here as a parking spot in a parking lot, the vehicle location 224 can be one of many locations, such as a garage, a street parking spot, or a staging location or route such as a route circling the building where the user device 204 is located.

The user device 204 is physically situated in a detectable or identifiable user location 226. In this example, the user location 226 is an office or room of a building nearby the parking lot associated with the vehicle location 224 and is shown in dotted line. A user may be holding the user device 204 in a hand, a pocket, or a bag, or the user device 204 may be positioned on a desk or table in the user location 226. The user device 204 may include or have access to user information such as the user location 226, calendar information, biometric information, purchase history information, user environment information, location history information, or user preference information.

Each piece of user information accessible to the user device 204 can be used as an input into a cost function to determine a probability or likelihood that the user associated with the user device 204 is ready for a pickup or a rendezvous with the vehicle 202. The cost function can determine a value for a confidence level that the user is ready for the pickup or the rendezvous, such as a low value for the confidence level, a medium value for the confidence level, or a high value confidence level. The cost function may be associated with a confidence threshold, and when the confidence level has a high value, or a value above the confidence threshold, the vehicle 202 can be controlled to execute a pickup or rendezvous with the user of the user device 204. When the confidence level has a low value, a medium value, or a value below the confidence threshold, the vehicle can be controlled to stage at a staging location or a parking lot, such as is shown by the vehicle 202 in FIG. 2.

Changes in the value of the confidence level determined by the cost function can be based on changes in the user information associated with the user device 204. For example, calendar information and location history information may indicate that the user of the user device 204 has a weekly tennis match across town in 45 minutes and has previously hailed the vehicle 202 approximately 30 minutes prior to the weekly tennis match. User environment information may indicate that the user of the user device 204 has turned off lights in the office (the user location 226) or moved the user device 204 from a desktop to a bag. Biometric information may indicate that the user of the user device 204 has been seated for a period of time but is now walking based on changes in heart rate of the user or changes to the user location 226. The user location 226 may have been generally restricted to the office or a suite of offices within the building for a period of time, but is now changing as the user device 204 begins to move along the path or route marked by the arrow A in dashed line in FIG. 2 as the user (e.g., carrying the user device 204 in a pocket or bag) moves away from the user location 226 and towards, for example, an exit or door of the building as shown by the arrow A.

If a change in the value of the confidence level determined using the cost function is, for example, sufficient to raise the value above the confidence threshold, the vehicle 202 can be controlled to execute a pickup or rendezvous with the user of the user device 204. The cost function can also be based on costs associated with having the vehicle 202 immediately ready to execute a pickup or rendezvous. Costs to have the vehicle 202 immediately ready to the user of the user device 204 include parking costs, fuel costs (e.g., when executing staging routes), traffic impacts to the environment 222, etc. The value of the confidence level of an imminent pickup or rendezvous determined using the cost function should be high enough to justify or overcome the costs associated with having the vehicle 202 ready to execute the pickup or rendezvous.

The term rendezvous can be used to encompass specific details such as a route for the vehicle 202 to travel from the vehicle location 224 to a pickup location 228 shown in dotted line, a departure time for the vehicle 202 to depart from the vehicle location 224, an arrival time for the vehicle 202 to arrive at the pickup location 228, and a vehicle configuration or other vehicle settings based on both vehicle information and user information available to the vehicle 202. The term trajectory can also be used to describe a path or route between locations. In the example of FIG. 2, the path or route marked by the arrow B shown in dashed line may be consistent with the vehicle 202 traveling to a previous pickup location (not shown) for the user of the user device 204. However, vehicle information related to traffic patterns may indicate to the vehicle 202 that the path or route marked by the arrow B is blocked or slowed due to an obstruction 230 (e.g. a pothole, a stalled vehicle, etc.).

Since the path or route marked by the arrow B is blocked or slowed by the obstruction 230, the vehicle 202 can be controlled to follow another path or route marked by the arrow C shown in dotted line that sends the vehicle to the pickup location 228. If the pickup location 228 is a deviation from where the user of the user device 204 expects to meet the vehicle 202 for the rendezvous or pickup, the user device 204 can send a notification to the user identifying the new pickup location 228. In another example, the vehicle can prompt the user of the user device 204 to provide authorization, for example, as an input to the user device 204, for the vehicle 202 to be directed to the pickup location 228 for the pickup.

Other forms of user information can also be used by the vehicle 202 to select between various paths or routes such as those marked by the arrows B and C. For example, a speed or rate at which the user device 204 is moving along the path or route marked by the arrow A may dictate to the vehicle 202 how quickly the user will reach the pickup location 228 (or an alternate pickup location, not shown). Calendar information can indicate an amount of time available prior to an event in the user's calendar for which the pickup is needed. In some examples, the user can be prompted by the user device 204 to provide a user authorization to send the vehicle 202 to the pickup location 228, for example, when a value of the confidence level of the cost function has a medium level, such as below a confidence threshold.

Figure 3:
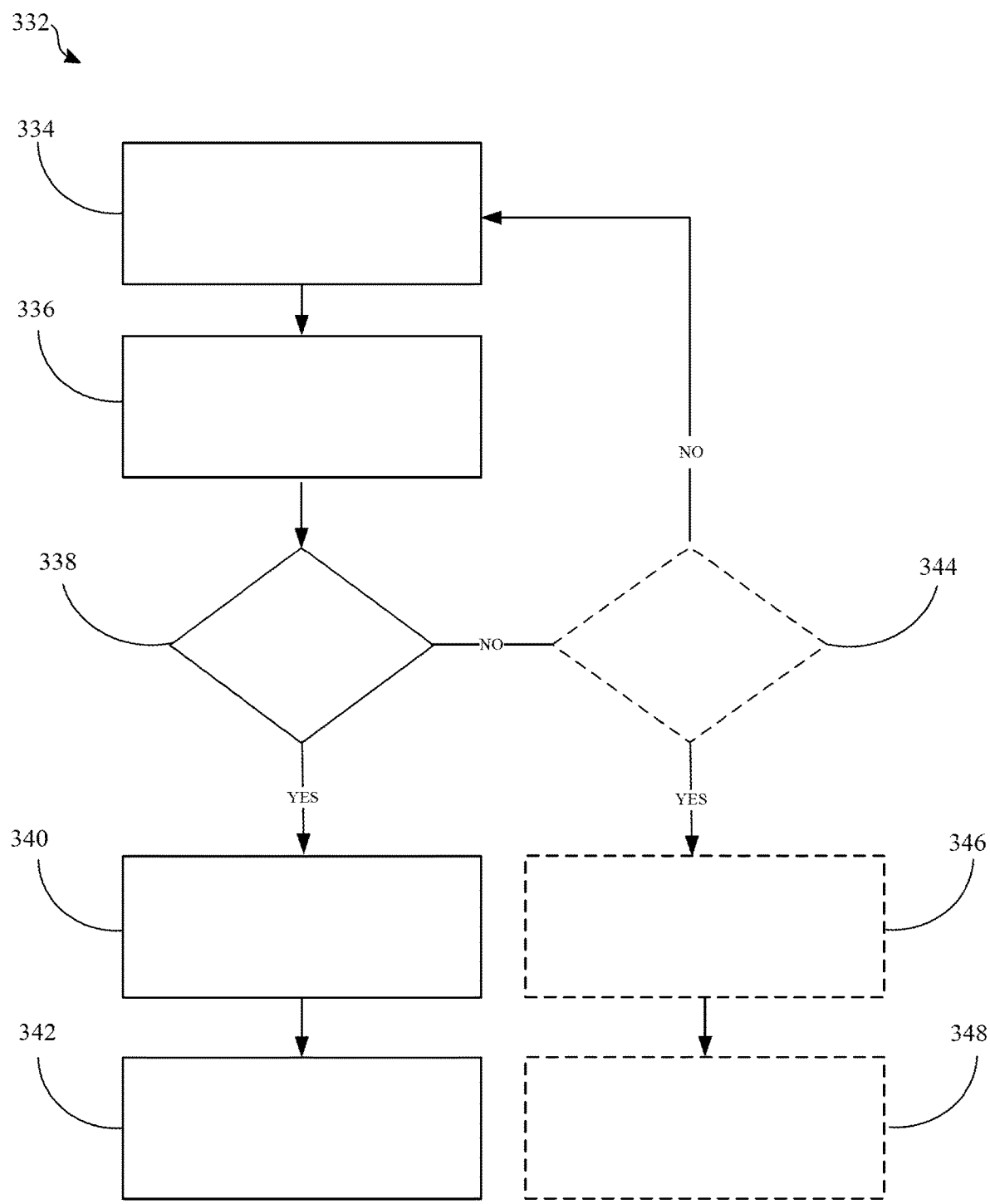
FIG. 3 is an illustration that shows a process of automated vehicle hailing.

FIG. 3 is an illustration that shows a process 332 of automated vehicle hailing. The process 332 can be implemented using the mobile ecosystem 100 of FIG. 1, the vehicle 202, and/or the user device 204 of FIG. 2. The process 332 will be described by referring back to the mobile ecosystem 100 of FIG. 1 that includes both the vehicle 102 and the user device 104 in communication with the network 120 and the vehicle 202 and the user device 204 of FIG. 2.

In operation 334, the network 120, the vehicle 102, or the user device 104 can receive user information from the user device 104. The user information can include one or more of a user authorization (indicating approval for the vehicle 102 to pick up the user); a user location; calendar information such as a schedule and location of events or meetings the user plans to attend; biometric information such as whether the user is seated, standing, or walking, the user's heart rate, walking speed or pace at which the user (holding the user device 104) is moving; a drowsiness level of the user, purchase history information that details user purchases such as recently paid for meals or recent goods or services purchases; user environment information such as whether the user device 104 is located outdoors, indoors, in a user's hand, or whether the environment in which the user device 104 is located is static, changing, dark, well lit, etc.; location history information such as whether the user often travels between specific locations on specific days at specific times; or user preference information such as a pickup vehicle configuration that describes seat settings, climate control settings, audio settings, mirror settings, or other setup information for the vehicle 102 that is preferred (or required) by the user.

In operation 336, the network 120, the vehicle 102, or the user device 104 can receive vehicle information from the vehicle 102. The vehicle information can include one or more of a vehicle location such as a current location where the vehicle 102 is positioned; traffic information such as traffic density, obstacles, traffic flow patterns, etc.; a current vehicle configuration such as existing seat settings or positions, climate control settings, audio settings, mirror settings, or other current setup information for the vehicle 102; or staging locations such as historically used locations or staging routes that allow the vehicle 102 to be readily or quickly available to the user of the user device 104.

In decision block 338, the network 120, the vehicle 102, or the user device 104 can determine whether a user is ready for a pickup based on the user information. The user information can provide various contextual hints to support estimating a value of a confidence that is above a predetermined confidence threshold of a cost function, for example, a high value for the confidence level. The cost function can be based on the user information available from the user device 104, and changes to a value of the confidence level can be based on changes to the user information. The cost function can be similar to the cost function described in respect to FIG. 2 and various pieces of user information, such as whether the user recently made a purchase or other payment, the user completed a workout, the user has an upcoming appointment, or the user packs the user device 104 in a bag, can be weighted and compared to determine the value of the confidence level that the user is ready for pickup. Determining that the user is ready for a pickup can also include receiving a user authorization from the user device 104. For example, if a low value or a medium value for the confidence level is determined using the cost function, the user device 104 can prompt the user to identify whether a pickup or rendezvous is desired, and the user can provide the user authorization through the user device 104 in response to the prompt.

If the decision block 338 determines that the user is ready for a pickup, the process 332 continues to the operation 340 where the network 120, the vehicle 102, or the user device 104 can identify a rendezvous based on the user information and the vehicle information. Details related to the rendezvous can include one or more of a pickup location, an arrival time or a pickup time, or a pickup vehicle configuration. Returning to FIG. 2 for a description of a detailed example, the pickup location 228 can be based on the vehicle location 224, the user location 226, other user information, such as whether the user is carrying a heavy purchase or the user enjoys walking a certain route or a certain number of steps to reach a fitness goal before arriving at the pickup location 228, and other vehicle information such as traffic patterns around the vehicle 202. The pickup time can be based on distances of the vehicle 202 or the user device 204 from the pickup location 228, a speed at which the user device 204 is moving or the vehicle 202 is moving toward the pickup location 228, or calendar information that indicates times and locations for upcoming meetings or appointments for the user in the user device 204. The pickup time and the pickup location 228 can be optionally communicated to the user through the user device 204. The pickup time and the pickup location 228 can also change based on changes to user information or vehicle information as the user device 204 and the vehicle 202 approach the pickup location 228.

The pickup vehicle configuration can be based on user information such as user seating, climate, or audio preferences, recent user purchases, biometric information, or calendar information. The term user vehicle configuration can also be used to describe a vehicle configuration based on user information. Determining whether to change from a current vehicle configuration to a user vehicle configuration or a pickup vehicle configuration can also be based on a value of the confidence level determined by the cost function that a user pickup is required, such as a value of the confidence level above the confidence threshold. For example, in situations with a high value for the confidence level, a change to the vehicle configuration from the current vehicle configuration to the pickup or user vehicle configuration may be executed prior to the vehicle 202 traveling to the pickup location 228. In situations with a medium value or a low value for the confidence level, such as values below the confidence threshold, no change to the vehicle configuration may be made, or no change to the vehicle configuration may be made until after a user authorization is received from the user device 204.

In some examples, the autonomous control system 108 of the vehicle can cause the vehicle 102 to change from a current vehicle configuration to the pickup vehicle configuration upon identification of the rendezvous or upon the vehicle 102 reaching the rendezvous (in the FIG. 2 example, the pickup location 228). If the user device 104 has user information that the user recently completed a workout and cool down, the seating system 112 can be configured for lounging or deep recline if historical user information or vehicle user information shows that the user enjoys resting or sleeping in a recline position after a workout. If the user device 104 provides user information to the network 120 or the vehicle 102 that the user recently purchased a large birthday cake, the seating system 112 can be configured to stow, collapse, or flatten one or more seats in the vehicle 102. In addition, a door or rear hatch of the vehicle 102 can be opened automatically when the user (holding the user device 104 and the birthday cake) approaches the vehicle 102 in order to simplify loading of the birthday cake into the vehicle. Other systems in the vehicle 102 can also be modified, changed, or otherwise configured to suit the needs or preference of the user as part of the pickup vehicle configuration.

In operation 342, the autonomous control system 108 of the vehicle 102 can cause the vehicle to travel to the rendezvous in response to the network 120 or the vehicle 102 determining that the user is ready for the pickup. For example, the autonomous control system 108 can send a command to the propulsion system 110 to move the vehicle 102 from a vehicle location (such as the vehicle location 224 in FIG. 2) toward a pickup location (such as the pickup location 228 in FIG. 2) according to a trajectory (such as in a direction or along a route as is shown by the arrow C in FIG. 2).

If the decision block 338 determines that the user is not ready for a pickup, the process 332 continues to optional decision block 344 denoted as optional using dotted lines. In the optional decision block 344, the network 120, the vehicle 102, or the user device 104 can optionally determine whether a user is ready for the vehicle 102 to shadow the user based on the user information. The term "shadow" is used to indicate that the vehicle 102 is positioned or located so as to be quickly ready for use by the user, for example, being positioned at a staging location (such as the vehicle location 224 of FIG. 2) or sent to follow a shadow route that keeps the vehicle 102 close to the user in order to shorten the hailing process or in anticipation that the user will become ready for a pickup or rendezvous soon.

Determining that the user is ready for the vehicle 102 to shadow the user in decision block 344 can include estimating a value for a confidence level below a confidence threshold of a cost function. For example, the value of the confidence level may be near but below the confidence threshold (e.g., within 5% or 10% of the value). In another example, the value for the confidence level may be above a second confidence threshold that is lower than the (first) confidence threshold associated with the user being ready for pickup in the decision block 338. In these examples, the value of the confidence level determined by the cost function can based on user information, and changes in the value of the confidence level can be based on changes to the user information.

If the decision block 344 determines that the user is ready for the vehicle 102 to shadow the user, the process 332 continues to optional operation 346 and will identify a shadow route or a staging location for the vehicle 102 based on the user information and the vehicle information. Returning to the example in FIG. 2, the vehicle 202 is currently in the vehicle location 224. The vehicle location 224 is nearby the user device 204 in that the parking lot is on one corner of an intersection and the user device 204 is inside a building on another corner of the same intersection, thus the vehicle location 224 serves as a suitable staging location. The vehicle 202 can remain at the vehicle location 224, the staging location, awaiting further input.

In some examples, the process 332 continues to optional operation 348, and the vehicle 102 is sent to follow the shadow route or travel to the staging location. Returning to the example in FIG. 2, if the parking lot where the vehicle 202 is stored in the vehicle location 224 is spaced a distance from the user device 204 (such as a distance of several blocks or several miles), the vehicle 202 could be controlled to start moving along the path or route marked by the arrow B or the path or route marked by the arrow C under the optional operation 348 as a shadow route. The vehicle 202 could also be controlled to travel around the block (not shown) or otherwise stage, circle, or remain near to the building where the user device 204 is located, such as by finding a nearby parking location to serve as a staging location. In this example, the shadow route may lead to a staging location. Thus, the shadow route and/or the staging location allow the vehicle 202 to remain close to the user device 204 so that vehicle hailing is a fast, easy process for the user of the user device 204.

If the optional decision block 344 determines that the user is not ready for the vehicle 102 to shadow the user, the process 332 returns to the operation 334 to receive user information and to operation 336 to receive vehicle information, and the process 332 starts over.

Figure 4:
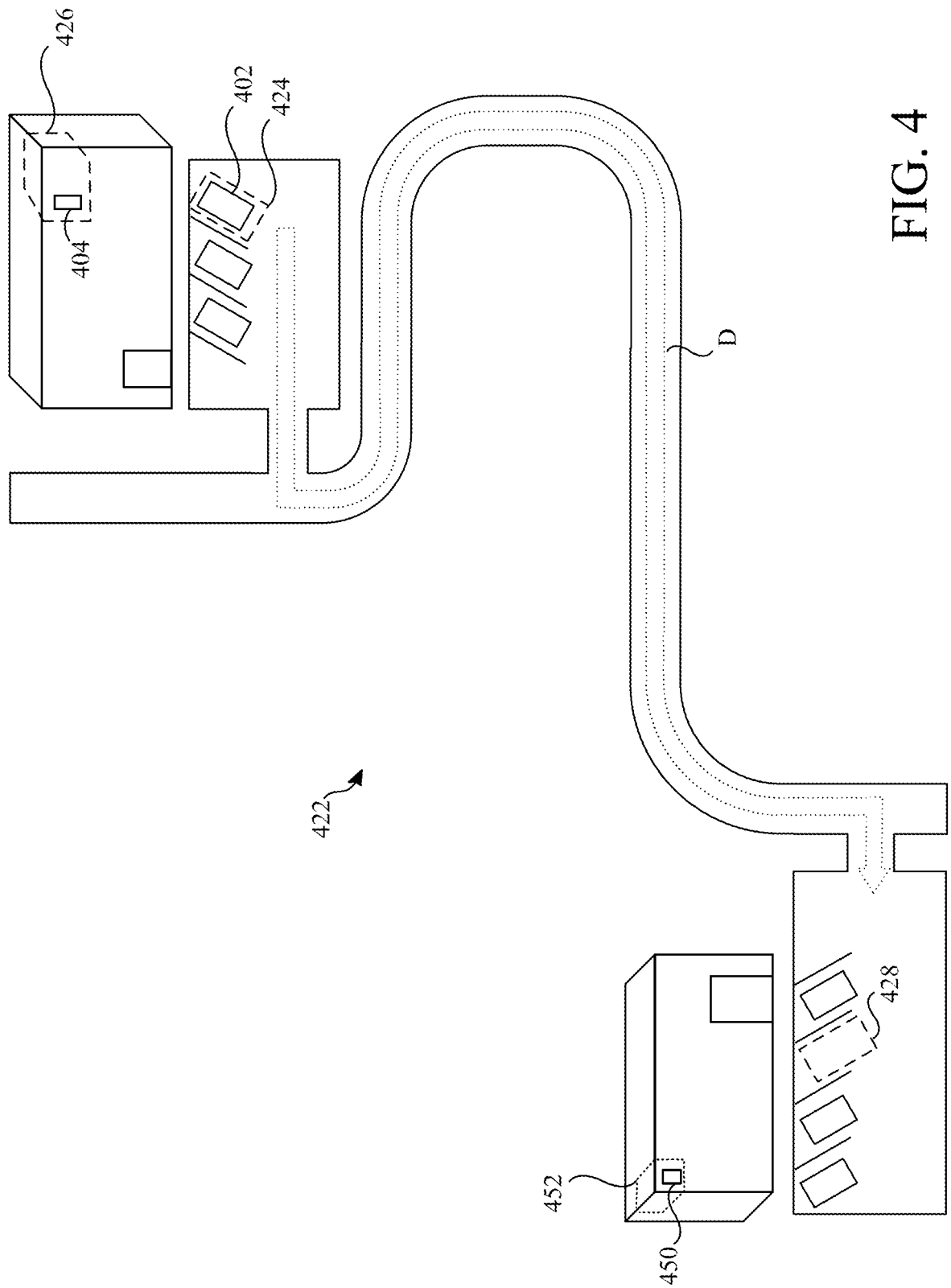
FIG. 4 is an illustration showing a vehicle and user devices in another environment.

FIG. 4 is an illustration showing a vehicle 402, a first user device 404 (e.g., in the possession of a first user), and a second user device 450 (e.g., in the possession of a second user) in an environment 422. The vehicle 402 and the first user device 404 are part of a mobile ecosystem and in communication with each other through a network (e.g., that includes a remote or cloud computing system, not shown). The first user device 404 can also be in communication with the second user device 450 through the network. The vehicle 402 and the user devices 404, 450 can have similar features to the vehicles 102, 202 and the user devices 104, 204 described in respect to FIGS. 1 and 2.

The vehicle 402 can be physically situated in a vehicle location 424 within the environment 422. In this example, the vehicle location 424 is a parking spot in an outdoor parking lot. The first user device 404 is physically situated in a first user location 426. In this example, the first user location 426 is an office or room of a building nearby the parking lot associated with the vehicle location 424. In this example, the vehicle 402 can be part of a mobile ecosystem associated with and readily available to the first user for hailing purposes. The vehicle location 424 is also physically available to the first user, for example, in a staging location, given that the vehicle location 424 is proximate to the first user location 426. The second user device 450 is physically situated in a second user location 452. In this example, the second user location 452 is a store, an office, or a room of a building that is spaced from the first user location 426 and the vehicle location 424.

The first user device 404 may include or have access to first user information such as the first user's location 426, calendar information, biometric information, purchase history information, environment information, location history information, or preference information. The second user device 450 may include or have access to second user information such as the second user's location 452, calendar information, biometric information, purchase history information, environment information, location history information, or preference information. With the first user device 404 and the second user device 450 in communication, for example, over a network, the second user device 450 may be able to provide second user information to the network, to the first user device 404, or to the vehicle 402 for purposes of the second user borrowing the vehicle 402 from the first user. The term borrowing is used to describe that the second user device 450 may not be part of the mobile ecosystem of the vehicle 402 and the first user device 404, but is nonetheless given permission to use the vehicle 402.

For example, the second user device 450 can be used to send a request to the first user device 404 related to borrowing the vehicle 402. If the first user is amenable to lending the vehicle 402 to the second user, a user authorization from the first user can be received by the first user device 404. Based on the user authorization, the vehicle 402 (or the first user device 404 or the network) can obtain second user information (e.g., from the second user device 450) that is sufficient to identify the second user location 452, the pickup location 428, and a pickup time (e.g., a rendezvous). The vehicle 402 can identify the rendezvous and be controlled to follow the trajectory marked by the arrow D in dotted line so that the vehicle 402 moves to the pickup location 428 at a spot convenient to the second user device 450 at the appropriate pickup time. The second user may be enjoying a dinner and drinks with friends and borrowing the vehicle 402 will help the second user avoid contacting a third-party ride share service, saving the user time and money if the first user approves of the vehicle 402 being borrowed.

In another example, the request to send the vehicle 402 to the pickup location 428 along the trajectory designated by the arrow D can be executed by the first user using the first user device 404. In this example, the second user in possession of the second user device 450 may be a pet, such as a turtle, the second user device 450 may be a smart tag with location information for the turtle, and the pickup location 428 may be proximate to a veterinarian's office where the turtle is undergoing his annual physical. The veterinarian may be able to load the turtle (and associated smart tag) into the vehicle 402 when the vehicle 402 is at the pickup location 428 before the vehicle 402 is controlled to return to the vehicle location 424 so that the turtle is reunited with the first user of the first user device 404 (e.g., the turtle's owner.) Though an example using a turtle is given, the second user may be a family member, a friend, or any other entity or cargo known to the first user, identifiable in location by the mobile ecosystem, and authorized for use of the vehicle 402 by the first user.

In another example, the vehicle 402 can be part of a fleet of vehicles (not shown). The first user device 404 and the second user device 450 can be part of a user network (not shown). The vehicle 402, the first user device 404, and the second user device 450 can be configured to provide vehicle information and user information, respectively, to support a method of forecasting demand across the user network and across the fleet of vehicles using the techniques and cost functions described herein. Forecasting demand for vehicles in the fleet can improve efficiency and lower cost for operating the fleet.

For example, user information accessible to the user devices 404, 450 can be used as an input into a cost function to determine a probability or likelihood that the users associated with the user devices 404, 450 are ready for a pickup or a rendezvous with the vehicle 402. A staging location for the vehicle 402 can be chosen based on which of the generally proximate user devices 404, 450 has a higher probability of an imminent hailing request. This staging method can be expanded beyond the vehicle 402 and the user devices 404, 450 to a full fleet of vehicles and user devices in a user network such that the fleet is predictively staged in proximity to various user devices in the user network based on forecasted probabilities of demand from the various user devices. This predictive staging may result in some vehicles in the fleet being repositioned to different physical locations, for example, based on changes to user information from the user devices in the user network that lead to changes to probabilities of imminent vehicle hailing as calculated using the cost functions described herein.

Figure 5:
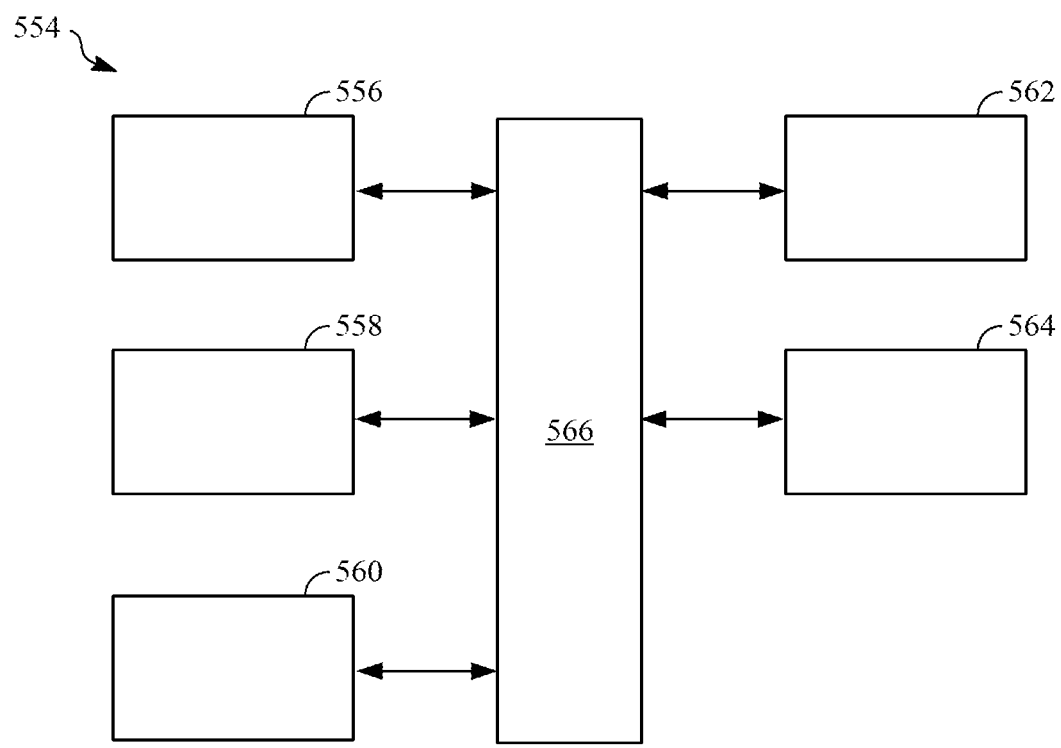
FIG. 5 is an illustration of a computing device.

FIG. 5 shows an example of a computing device 554 that may be used to implement the autonomous control system 108 or other components of the mobile ecosystem 100, the vehicle 202, or the user devices 204, 404, 450. In the illustrated example, the computing device 554 includes a processor 556, a memory device 558, a storage device 560, one or more input devices 562, and one or more output devices 564. These components may be interconnected by hardware such as a bus 566 that allows communication between the components.

The processor 556 may be a conventional device such as a central processing unit and is operable to execute computer program instructions and perform operations described by the computer program instructions. The memory device 558 may be a volatile, high-speed, short-term information storage device such as a random-access memory module. The storage device 560 may be a non-volatile information storage device such as a hard drive or a solid-state drive. The input devices 562 may include sensors and/or any type of human-machine interface, such as buttons, switches, a keyboard, a mouse, a touchscreen input device, a gestural input device, or an audio input device. The output devices 564 may include any type of device operable to send commands associated with communication or autonomous operation or provide an indication to a user regarding an authorization or status, such as a display screen, an interface for vehicle operation, or an audio output.

As described above, one aspect of the present technology is the gathering and use of data available from various sources, such as from the sensor systems 106, 114 or the user profile 118, to improve the function of a mobile ecosystem such as the mobile ecosystem 100 of FIG. 1. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of personal information data, in the present technology, can be used to the benefit of users. For example, the personal information data can be used in a mobile ecosystem to best match user preferences or be stored and safeguarded, for example, in association with the user profile 118 in the user device 104. Other uses for personal information data that benefit the user are also possible. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user-profile-based mobile ecosystems, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can be implemented without the need for accessing such personal information data. That is, the various embodiments of the present technology are not rendered inoperable due to the lack of all or a portion of such personal information data. For example, changes in operation of a mobile ecosystem can be implemented for a given user by inferring user preferences or user status based on non-personal information data, a bare minimum amount of personal information, other non-personal information available to the system, or publicly available information.

What is claimed is:

1. A mobile ecosystem, comprising:
a user device in communication with a network; and
a vehicle having an autonomous control system in communication with the network,
wherein at least one of the user device, the vehicle, or the network is operable to:
receive user information from the user device;
receive vehicle information from the vehicle; and
identify a rendezvous based on the user information and the vehicle information,
wherein the vehicle is configured to travel to the rendezvous in response to the user device, the vehicle, or the network determining that a user is ready for a pickup based on the user information,
wherein the vehicle is configured to travel a shadow route that keeps the vehicle within a predetermined proximity of the user device in response to the user device, the vehicle, or the network determining that the user is ready for the vehicle to shadow the user, and
wherein determining the user is ready for the vehicle to shadow the user includes determining that a value of a confidence level is below a first confidence threshold of a cost function and above a second confidence threshold of the cost function.

2. The mobile ecosystem of claim 1, wherein the user information includes at least one of a user authorization, a user location, calendar information, biometric information, purchase history information, user environment information, location history information, or user preference information.

3. The mobile ecosystem of claim 2, wherein determining the user is ready for the pickup includes receiving the user authorization from the user device.

4. The mobile ecosystem of claim 1, wherein the vehicle information includes at least one of a vehicle location, traffic information, a current vehicle configuration, or staging locations.

5. The mobile ecosystem of claim 4, wherein the rendezvous includes at least one of a pickup location, a pickup time, or a pickup vehicle configuration.

6. The mobile ecosystem of claim 5, wherein the autonomous control system of the vehicle is operable to: cause the vehicle to change from the current vehicle configuration to the pickup vehicle configuration upon the vehicle reaching the rendezvous.

7. The mobile ecosystem of claim 1, wherein determining the user is ready for the pickup includes estimating a value of a confidence level above a confidence threshold of a cost function, wherein the cost function is based on the user information, and wherein changes in the value of the confidence level are based on changes to the user information.

8. The mobile ecosystem of claim 1, wherein the user device, the vehicle, or the network is operable to:
   determine the user is ready for the vehicle to shadow the user based on the user information; and
   cause the vehicle to follow the shadow route.

9. The mobile ecosystem of claim 8, wherein the cost function is based on the user information, and wherein changes in the value of the confidence level are based on changes to the user information.

10. A vehicle, comprising:
    an autonomous control system configured to:
       obtain vehicle information including a vehicle location of the vehicle;
       obtain user information including a user location of a user device;
       based on a cost function that estimates a value of a confidence level above a first confidence threshold using the user information:
          determine that a user of the user device is ready for a pickup by the vehicle;
          identify a pickup location for the vehicle based on the user information and the vehicle information; and
          determine a trajectory from the vehicle location to the pickup location; and
       based on the cost function that estimates the value of the confidence level below the first confidence threshold and above a second confidence threshold using the user information:
          send a request for user authorization to change from a current vehicle configuration to a user vehicle configuration; and
    a propulsion system configured to cause motion of the vehicle from the vehicle location toward the pickup location according to the trajectory.

11. The vehicle of claim 10, wherein the vehicle information includes at least one of traffic information, a current vehicle configuration, or staging locations.

12. The vehicle of claim 11, wherein the user information includes at least one of calendar information, biometric information, purchase history information, user environment information, location history information, or the user vehicle configuration.

13. The vehicle of claim 12, wherein the autonomous control system is configured to:
    based on the cost function that estimates the value of the confidence level above the first confidence threshold, cause the vehicle to change from the current vehicle configuration to the user vehicle configuration at the pickup location.

14. The vehicle of claim 10, wherein the trajectory includes a departure time from the vehicle location, a route for vehicle travel between the vehicle location and the pickup location, and an arrival time at the pickup location.

15. The vehicle of claim 10, wherein determining that the user of the user device is ready for the pickup by the vehicle includes receiving authorization information from the user device that authorizes the pickup.

16. The vehicle of claim 10, wherein the autonomous control system is configured to:
    based on the cost function that estimates the value of the confidence level below the first confidence threshold and above the second confidence threshold:
       determine the user is ready for the vehicle to shadow the user based on the user information;
       identify a shadow route for the vehicle to travel based on the user information and the vehicle information; and
       cause the vehicle to follow the shadow route that keeps the vehicle within a predetermined proximity of the user.

17. A method of hailing a vehicle, comprising:
    obtaining user information including a user location from a user device;
    obtaining vehicle information including a vehicle location from the vehicle;
    in response to determining that a user is ready for a pickup by the vehicle based on the user information:
       identifying a rendezvous based on the user information and the vehicle information; and
       sending a command to an autonomous control system of the vehicle to cause the vehicle to travel atoll from the vehicle location to the rendezvous; and
    in response to determining that the user is ready for the vehicle to shadow the user based on the user information:
       identifying a shadow route for the vehicle to follow based on the user information and the vehicle information; and
       sending a command to the autonomous control system of the vehicle to cause the vehicle to follow the shadow route,
    wherein determining that the user is ready for the vehicle to shadow the user includes estimating a value of a confidence level below a first confidence threshold of a cost function and above a second confidence threshold of the cost function.

18. The method of claim 17, wherein determining that the user is ready for the pickup includes estimating the value of the confidence level above the first confidence threshold of the cost function.

19. The method of claim 17, wherein determining that the user is ready for the pickup includes receiving authorization information from the user device that authorizes the pickup.

20. The method of claim 17, wherein the cost function is based on the user information, and wherein changes in the value of the confidence level are based on changes to the user information.

\* \* \* \* \*